United States Patent
Wieczorek (10) Patent No.: US 8,242,453 B2
(45) Date of Patent: Aug. 14, 2012

(54) IMAGING SYSTEM FOR NUCLEAR MEDICINE

(75) Inventor: Herfried Wieczorek, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 540 days.

(21) Appl. No.: 12/488,824

(22) Filed: Jun. 22, 2009

(65) Prior Publication Data

US 2009/0261256 A1    Oct. 22, 2009

Related U.S. Application Data

(63) Continuation-in-part of application No. 11/577,093, filed as application No. PCT/IB2005/053231 on Sep. 30, 2005, now Pat. No. 7,683,333.

(60) Provisional application No. 60/636,745, filed on Dec. 16, 2004, provisional application No. 60/619,080, filed on Oct. 15, 2004.

(51) Int. Cl.
  *G21K 1/02*  (2006.01)
  *G01T 1/166*  (2006.01)
(52) U.S. Cl. .................. 250/363.1; 250/363.05
(58) Field of Classification Search ............... 250/363.1, 250/363.05
  See application file for complete search history.

(56) References Cited

U.S. PATENT DOCUMENTS

| | | | |
|---|---|---|---|
| 4,066,901 A | 1/1978 | Seppi et al. | |
| 4,095,107 A | 6/1978 | Genna et al. | |
| 4,277,684 A | 7/1981 | Carson | |
| 4,610,021 A | 9/1986 | Peschmann et al. | |
| 5,198,680 A | 3/1993 | Kurakake | |
| 5,289,008 A | 2/1994 | Jaszczak et al. | |
| 5,311,427 A | 5/1994 | Ichihara | |
| 5,625,660 A * | 4/1997 | Tuy | 378/15 |
| 5,757,006 A | 5/1998 | DeVito et al. | |
| 6,242,743 B1 | 6/2001 | DeVito et al. | |
| 6,288,397 B1 * | 9/2001 | Maor | 250/363.08 |
| 6,324,258 B1 | 11/2001 | Beekman | |
| 6,407,391 B1 * | 6/2002 | Mastrippolito et al. | 250/363.1 |
| 6,525,320 B1 | 2/2003 | Juni | |
| 6,754,304 B1 * | 6/2004 | Kumakhov | 378/45 |
| 6,762,413 B2 | 7/2004 | Zeng | |

(Continued)

FOREIGN PATENT DOCUMENTS

EP   1120086 A1   8/2001

(Continued)

OTHER PUBLICATIONS

Accorsi, R., et al.; Analytic Determination of the Resolution-Equivalent Effective Diameter of a Pinhole Collimator; 2004; IEEE Trans. on Medical Imaging; 23(6)750-763.

(Continued)

*Primary Examiner* — David Porta
*Assistant Examiner* — Mindy Vu (57) ABSTRACT

A imaging system for acquiring an image of a subject comprising a gantry (810) having a plurality of detection modules (812). Each detection module comprising a radiation detector and a collimator adjacent a radiation receiving face of the detector. The collimator comprises a plurality of spaced slats and a body adjacent the slats which defines at least one elongated slit extending in an axial direction (824). The slit is arranged such that radiation (822) passes through the slit and between the slats to the detector. The body is opaque to the radiation. The detection modules have a common focus (820) and do not move during acquisition of the image.

18 Claims, 8 Drawing Sheets

U.S. PATENT DOCUMENTS

| | | |
|---|---|---|
| 6,967,331 B2 | 11/2005 | Van Dulmen et al. |
| 7,312,456 B2 | 12/2007 | Joung et al. |
| 2004/0251419 A1 | 12/2004 | Nelson et al. |
| 2008/0001090 A1 | 1/2008 | Ben-Haim et al. |
| 2009/0022279 A1 | 1/2009 | Wieczorek |
| 2009/0032716 A1 | 2/2009 | Wieczorek et al. |

FOREIGN PATENT DOCUMENTS

| | | | |
|---|---|---|---|
| JP | 2003-222676 A | * | 8/2003 |
| WO | 9503554 A1 | | 2/1995 |
| WO | 2005118659 A2 | | 12/2005 |
| WO | 2005119025 A2 | | 12/2005 |
| WO | 2006040707 A1 | | 4/2006 |
| WO | 2007106674 A2 | | 9/2007 |
| WO | 2007109227 A2 | | 9/2007 |

OTHER PUBLICATIONS

Brice, J.; SPECT rides first wave of clinical MI applications; 2003; Diagnostic Imaging; http://www.dimag.com/molecularimagingoutlook/2003sep/.

Brice, J.; Nanoparticles pack heavyweight punch; 2004; Diagnostic Imaging; http://www.dimag.com/molecularimagingoutlook/2004mar/03.jhtml.

Gagnon, D., et al.; Design Considerations for a New Solid-State Gamma-Camera: SOLSTICE; 2001; IEEE Nuclear Science Symposium Conference Record; pp. 1156-1160.

Gindi, G. R., et al.; Imaging with rotating slit apertures and rotating collimators; 1982; Med. Phys.; 9(3)324-339.

Goedicke, A., et al.; Image Quality Assessment of Pixellated Systems; Oct. 2004.

Lodge, M. A., et al.; The experimental evaluation of a prototype rotating slat collimator for planar gamma camera imaging; 1995; Phys. Med. Biol.; 40:427-448.

Petrillo, M., et al.; Imaging Performance of Tiled Solid-State Detectors; Oct. 2004.

Reckess, G. Z.; Nano-targeting cancer and heart disease; 2003; http://news-info.wusl.edu/tips/page/normal/203.html.

Rogers, W. L., et al.; SPRINT II: A Second Generation Single Photon Ring Tomograph; 1988; IEEE Trans. on Medical Imaging; 7(4)291-297.

Webb, S., et al.; Monte Carlo modelling of the performance of a rotating slit-collimator for improved planar gamma-camera imaging; 1992; Phys. Med. Biol.; 37(5)1095-1108.

Metzler, et al.; On-Axis Sensitivity and Resolution of a Slit-Slat Collimator; 2006; J. Nuclear Medicine; 47(11) 1884-1890.

Wieczorek, H., et al.; Analytical Model for SPECT Detector Concepts; 2006; IEEE Trans. on Nuclear Science; 53(3) 1102-1112.

* cited by examiner

IMAGING SYSTEM FOR NUCLEAR MEDICINE

This application claims priority to and is a continuation in part of U.S. patent application Ser. No. 11/577,093, filed on Apr. 12, 2007 now U.S. Pat. No. 7,683,333 as a national stage entry of PCT Patent Application No. PCT/IB 05/53231, filed on Sep. 30, 2005, and to U.S. Provisional Patent Application Ser. Nos. 60/636,745 filed on Dec. 16, 2004 and 60/619,080 filed on Oct. 15, 2004, each of which is fully incorporated herein by reference.

The present application relates to the production of images with a nuclear camera. It finds particular application in conjunction with a fan beam collimator having a slit, and will be described with particular reference thereto. A one-dimensional parallel-hole collimator having a slit may also be used. It is to be appreciated that the present exemplary embodiments are also amenable to other like applications.

Nuclear imaging techniques generally obtain images in one of two different ways. Emission images are generated by introducing a radioactive isotope to the subject and collecting radiation coming from within the subject with a detector sensitive to such radiation (camera). Such emission images include Single Photon Emission Computed Tomography (SPECT) images and are often used to provide functional information regarding the subject, such as a tumor within a patient. When several emission projection images are made, in mutually different directions, it is possible to compute (reconstruct) from the obtained data the concentration distribution of the radiation-generating matter in the object in the form of a volumetric emission tomography image.

Transmission images are generated by positioning the subject intermediate a radiation source, such as a source of gamma radiation, and the detector so that the radiation that passes through the subject is detected with the camera. Transmission images provide information about the distribution of radiation-attenuating or radiation-absorbing matter in the subject.

Transmission images and emission images are often performed simultaneously, for example, for correction of the emission image for attenuation of the radiation in the object. For example, a SPECT imaging device is sometimes used to generate both emission and transmission images.

Photons generated inside and transmitted through the subject are detected by the detector, such as an NaI crystal and an array of photomultipliers. To define a trajectory of each received emission event and to discriminate between direct radiation and scattered radiation, a collimator is placed before the camera. In transmission imaging, a predetermined spatial geometry of the radiation source also determines the trajectory of the transmission radiation events. The collimator, which includes a grid or honeycomb-like array of radiation absorbent material, is located between the detector and the subject being examined to limit the angle of acceptance of radiation which impinges on the detector. Resolution and efficiency are defined by the shape of the collimator and the height and thickness of septa defining grid, with thicker septa generally being used for higher energy ranges.

One problem in SPECT imaging is the limited detector efficiency for a given spatial resolution. Current Anger cameras differ in their relative optimizations. Static detectors (i.e., those which maintain the same general orientation towards the radiation source) for planar or SPECT imaging include parallel hole, fan beam, cone beam, and pinhole collimation. The parallel hole detector includes a collimator with parallel slats in a first direction which intersect parallel slats in a second direction. The collimator is used in combination with a planar source for transmission measurements. The efficiency of such a collimator is relatively low because the planar radiation source radiates radiation in all directions within a particular solid angle, but only a very limited portion is utilized in making the transmission image, namely, only the portion that is directed in the direction of the passages of the collimator. As a consequence, a relatively strong source is used for making a transmission image with a predetermined brightness.

Improvements in efficiency over the parallel hole detector may be achieved by focused collimators in which the slats are oriented towards a focus which is at the same side of the collimator as the object to be measured. A fan beam collimator includes slats which are focused in one direction and which are parallel in the other direction. The fan beam collimator is used with a line radiation source for transmission measurements which is arranged along the focal line. A cone beam collimator includes slats which are focused in both directions and may be used with a point radiation source at the focal point for transmission measurement. The use of a line source together with a fan beam collimator or a point source with a cone beam collimator provides an advantage over the combination of a planar source and a parallel collimator in that the radiation produced is better utilized, and hence the amount of radioactive matter of the radiation source can be less. Further, the emission and transmission recordings are improved because converging collimators, due to the magnifying effect, count more photons than do parallel collimators. However, the improvements which can be achieved by such focused collimators are limited, especially for higher energy photons which require thick septa and cause partial shadowing of the pixels.

As an alternative to static detector systems, dynamic detector concepts have been proposed, among them rotating slat or slit detectors, coded aperture imaging, and overlapping detector regions. These concepts tend to suffer from noise accumulation due to the necessary extra reconstruction step.

In accordance with one aspect of the present invention, an imaging system is provided. The imaging system may comprise a gantry having a plurality of detection modules. Each detection module may comprise a radiation detector and a collimator adjacent a radiation receiving face of the detector. The collimator may comprise a plurality of spaced slats and a body adjacent the slats which defines at least one elongated slit extending in an axial direction. The slit may be arranged such that radiation passes through the slit and between the slats to the detector. The body may be opaque to the radiation. The detection modules may have a common focus and may not move during acquisition of the image.

In accordance with another aspect, an imaging method is provided. Radiation may be directed from a source towards a gantry of an imaging system having a plurality of detection modules. The detection modules may have a common focus and may not move during acquisition of the image. The collimator may be interposed between the radiation source and the radiation detector. The collimator may be adjacent a radiation receiving face of the detector. The collimator may comprise a plurality of spaced slats and a body adjacent the slats which defines at least one elongated slit extending in an axial direction. The slit may be arranged such that the radiation passes through the slit and between the slats to the detector.

An advantage of at least one embodiment arises from the ability to achieve higher efficiencies than for other static detector concepts.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not to be construed as limiting the invention.

Figure 1:
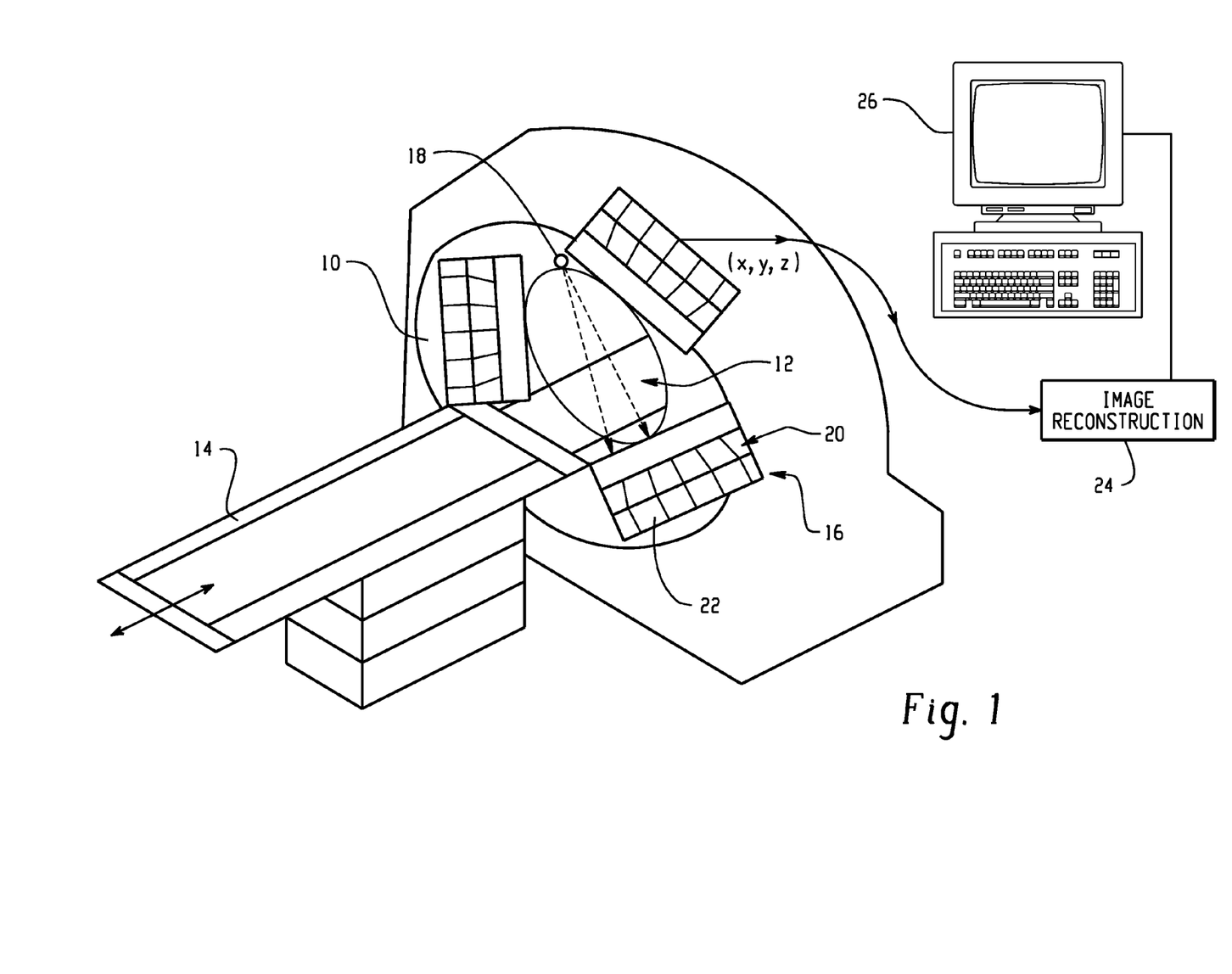
FIG. 1 is a perspective view of a nuclear imaging system.

With reference to FIG. 1, a perspective view of an imaging system for generation of transmission images or combined emission/transmission images is shown. The imaging system includes an imaging region 10 in which a subject, such as a patient 12 lies or is transported therethrough on a moveable support 14. One or more radiation detection systems or heads 16 are positioned adjacent to the patient to monitor and record transmitted and/or emitted radiation events. A source of transmission radiation 18, such as a gamma radiation source, is positioned such that radiation emitted by the source enters the subject and received in the form of photons by an opposing detection system 16. Alternatively or additionally, a radiopharmaceutical introduced to the subject 12 serves as a source of radiation for SPECT imaging. Typically, the emission and transmission radiation have different energies to facilitate differentiating them. The detection system includes a collimator 20 and a detector 22. The collimator is positioned intermediate the subject 12 and the detector 22 to limit the angle of acceptance of radiation which impinges on the detector. The detector 22 is linked to a processing system 24, which may be embodied in an operator work station, computer network, or other suitable hardware/software. The processing system 24 reconstructs an image of the subject, based on signals from the detector, which is displayed by a display 26, such as a screen or printout.

The detector 22 includes a sensor, which detects radiation (typically photons) generated as a result of the interaction of the radiation with the subject. One suitable sensor includes a scintillator, such as a single crystal, such as a sodium iodide crystal, or a matrix of smaller crystals. The crystal is positioned adjacent a matrix of photomultiplier tubes ("PMTs"). Each radiation event impinging on the scintillator generates a corresponding flash of light (scintillation) that is seen by the PMTs. Based on the outputs from the PMTs, radiation events are mapped, which include the energy and position of radiation rays impinging the scintillator. Other detectors include a matrix of scintillation crystals, i.e. a pixelated detector, which are mated with photodiodes or avalanche detectors in place of photomultiplier tubes. Alternatively, a cadmium zinc telluride (CZT) or other direct conversion detector is used which converts radiation photons directly to electrons (current) without a scintillator.

The image quality of the SPECT images is typically determined by a count sensitivity of the detector and the geometry of the collimator.

Figure 2:
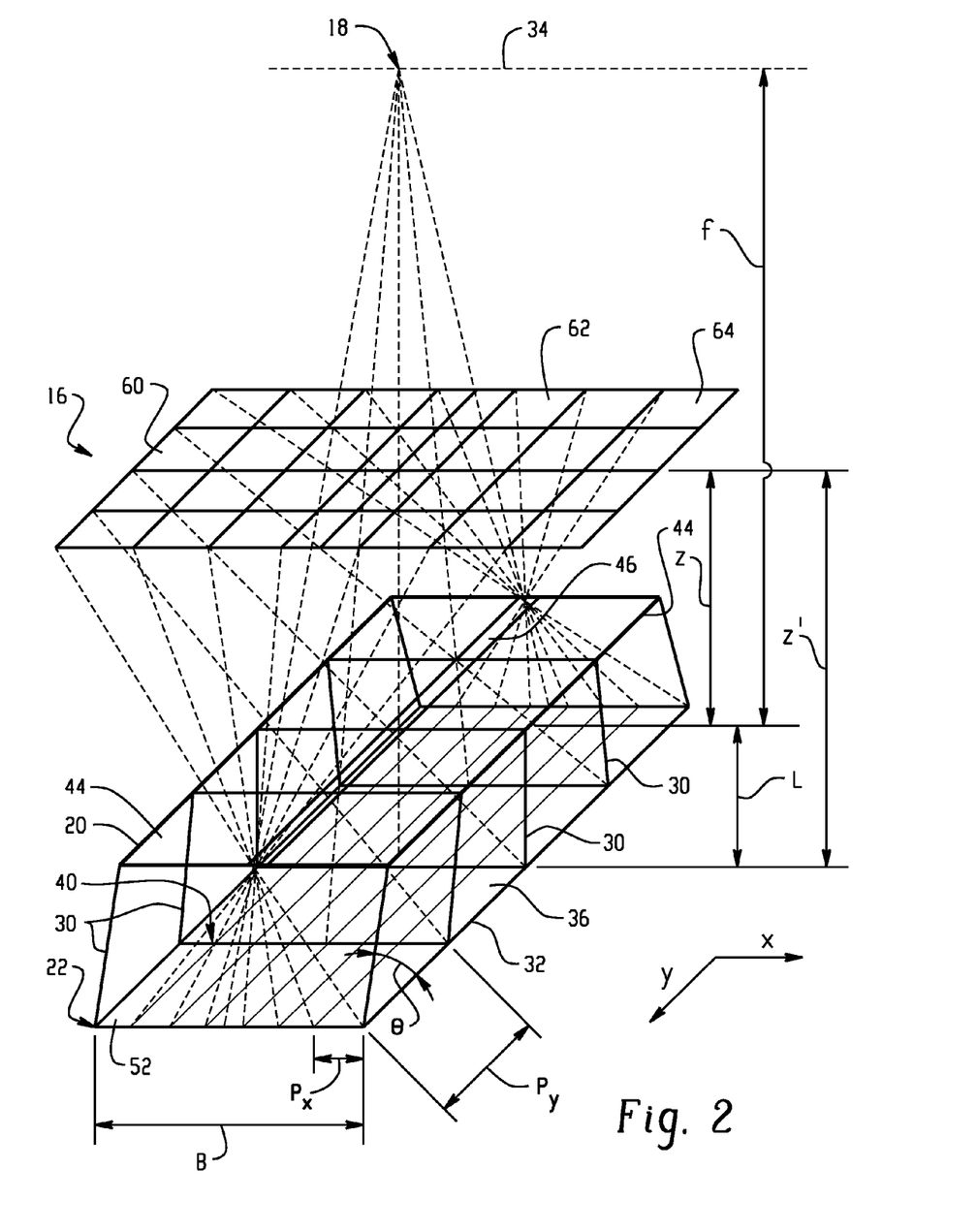
FIG. 2 is a perspective view of a first embodiment of a detection system for the nuclear imaging system of FIG. 1.
Figure 3:
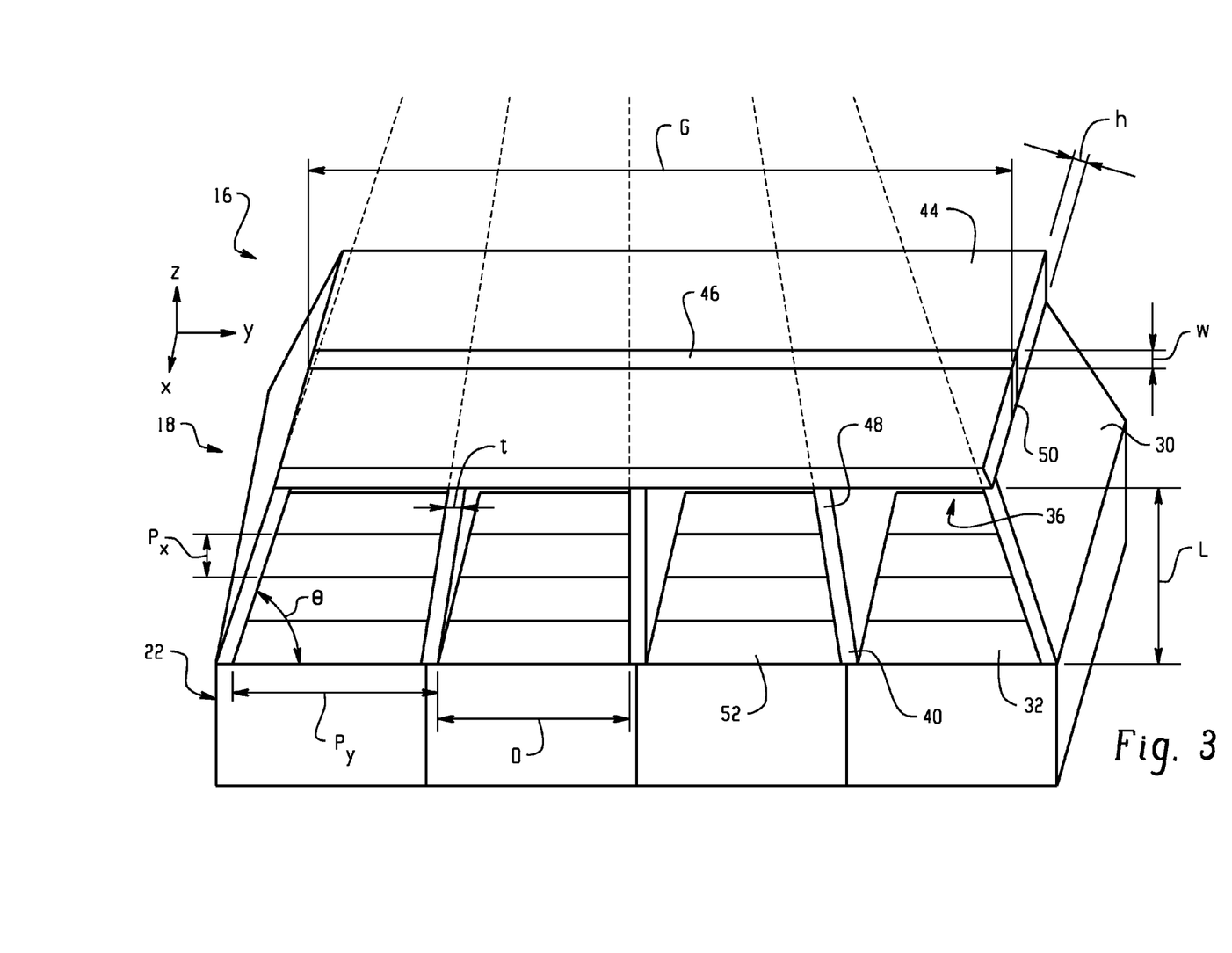
FIG. 3 is a side perspective view of the detection system of FIG. 2.

With reference now to FIGS. 2 and 3, the collimator 20 is formed of a dense radiation absorbing material, such as tungsten. The collimator 20 can be regarded as a transmission means with a direction-selective transmission characteristic, which ensures that a detection segment of the detection surface of the detector can only be irradiated by radiation with a predetermined limited range of directions. The presently illustrated collimator can be described as a fan beam-slit collimator. The fan beam portion of the collimator is provided by a plurality of closely spaced slats or septa 30 (five are illustrated but the number is typically much larger). The slats 30 are planar. In the illustrated embodiment, a generally planar radiation receiving face or detection surface 32 of the detector 22 lies in a plane defined by y and x axes and the collimator slats 30 extend away from the plane generally in a z direction. Specifically, the slats 30 extend from the planar surface 32 of the detector towards the radiation source 18 and converge towards a focal line 34. In the illustrated embodiment, the source 18 comprises a line source which is collinear with the focal line 34 of the slats for optimal efficiency, although it is also contemplated that the source may be spaced further from, or closer to the detector 22. Although there may be only a single transmission source opposite one of a plurality of heads, all heads have a common collimator. Due to the convergence, the outer slats are oriented at a shallower angle θ to the plane of the detector than the inner slats, the angle θ increasing towards the center, where the center slat is oriented at 90° to the plane x, y. The slats 30 define a plurality of parallel passages 36 therebetween. As a result of the focused slats, a centerline of each passage intersects the line-shaped radiation source 18. The passages 36 extend the full width B of the detector plane in the x direction, i.e., there are no intersecting slats as in a conventional fan beam or cone-shaped collimator.

Ends 40 of the slats closest to the detector 22 are equally spaced, adjacent the detector in the y direction, with a pitch P. Preferably, the ends 40 of the slats are spaced to coincide with the interface between adjacent rows of elements of a pixelated detector. Due to the thickness of the slats t, the distance between adjacent slats D=P−t. The slats have a height L in the z direction and a width B in the x direction, which is greater than the height L. In one embodiment, the pitch $P_y$ is about 1-3 mm, the distance between adjacent slats D is about 0.80 to about 2.95 mm, the thickness of the slats t is about 0.05 mm to about 0.5 mm, e.g., about 0.15 mm, the height L is from about 10 mm to about 100 mm, and in one specific embodiment, L is less than about 60 mm.

The slit portion of the collimator is defined by a body generally in the form of a plate 44 which lies in a plane parallel to the plane 32 of the detector 22. The plate is formed of a radiation opaque material, such as a radiation impermeable, or substantially impermeable material. As best shown in FIG. 3, the plate defines an elongate slit 46 which extends a length G of the detector in the y direction, which is greater than the distance $P_y$ between slats. The slit has a width w in the x direction. Length G is substantially greater than the width w. In one embodiment, w is from about 0.3 mm to about 3 mm. The narrower the slit, the higher the resolution. The plate 44 has a thickness h in the z direction, which is the height of the slit 46, of from about 0.5 mm to about 5 mm, the higher thickness being more suited to higher energies. In the illustrated embodiment, the plate 44 is located at height L above the plane 32, i.e., in contact with upper ends 48 of the slats 30 although it is also contemplated that the plate may be spaced from the plane by a distance somewhat greater than L, but generally less than 2 L. The focus 34 is located a distance f from the plane 44. Side walls 50 of the slit may be aligned with the z axis, as shown, or angled to the z axis, for example in a V shape or an inverted V shape.

The illustrated detector 22 is pixellated. As shown in FIG. 2, a row of pixels 52 extends between each pair of adjacent slats 30. The pixels are configured for independently sending signals to the processing system 24. The pixels each have a pixel width or pitch $P_x$ in the x direction and a length D in the y direction. In one embodiment, $P_x$ is from about 0.5 mm to about 2.5 mm. Seven pixels 52 are illustrated in each row/passage, although a much greater number of pixels is typically employed. In one embodiment, the pixel pitch $P_x$ is greater than or equal to half the slit width w but less than the interval between slits.

Radiation from an object plane 60 spaced a height z above the plane 44 accesses the detector 22 only through the slit 46, as shown by the hatched lines in FIG. 2. The field of view (FOV) 62 is the area within the plane. The area of the projected image on the detector, which in the embodiment of FIG. 2 is defined by the area of the plane 32, is smaller in the x direction than the object plane. As can be seen from FIG. 2, each pixel 52 in the detector has an area $P_x \times D$, which is smaller in the x direction and larger in the y direction than the area of a corresponding pixel 64 in the object plane, resulting in a magnifying effect in the y direction.

Figure 6:
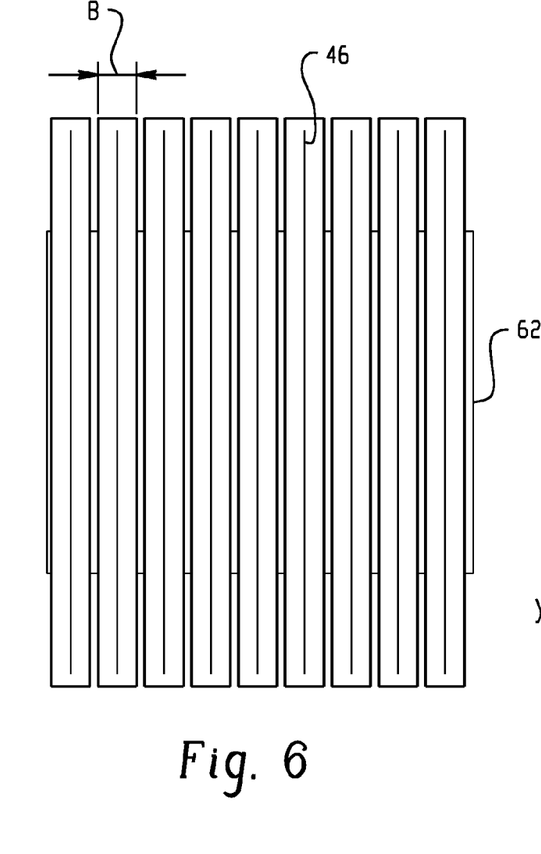
FIG. 6 is a top plan view of a second embodiment of a detection system for the nuclear imaging system of FIG. 1.
Figure 7:
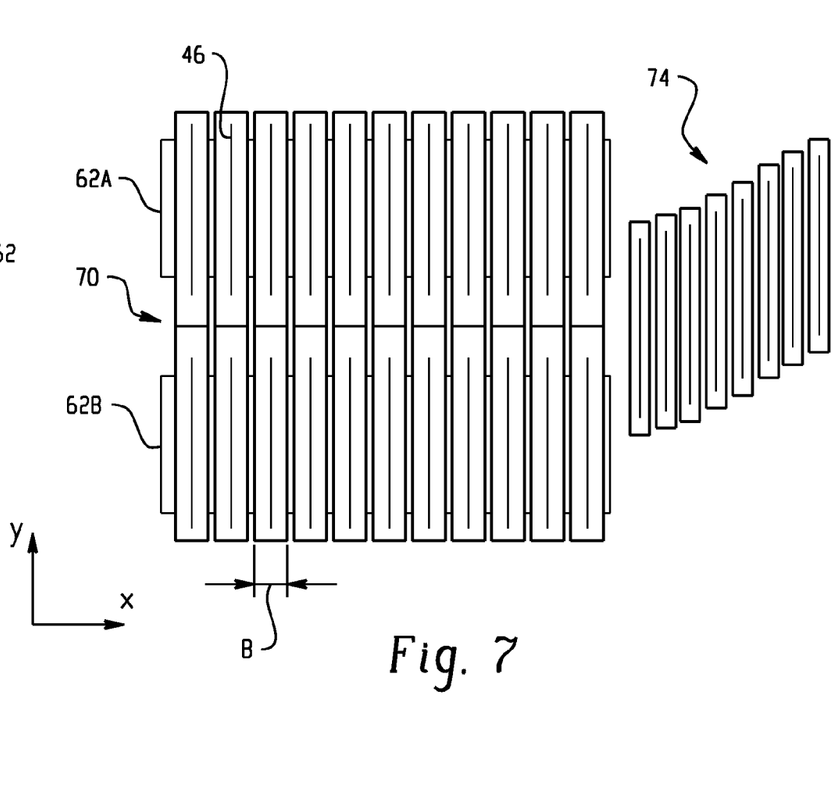
FIG. 7 is a top plan view of a third embodiment of a detection system for the nuclear imaging system of FIG. 1.

It will be appreciated that the detector plane 32 is typically larger than the projected image, for example, where multiple slits and/or multiple modules are employed. Where the detection system 16 includes multiple slits 46, each slit serves a different portion, or partially overlapping portion of the detector plane 32, to increase the area of detection. In one embodiment, the slits are oriented parallel to one another, as illustrated in FIGS. 6 and 7, each slit and its associated slats comprising a module. The slats of one module may be continuations of the slats of an adjacent module. Or, more than one module may share the same slit. In one embodiment, the spacing S between adjacent slits is from about 5 to 100 mm, and in one specific embodiment, from 5 to 50 mm (FIG. 7).

In the illustrated embodiment, the detector 22 is a static detector, i.e., does not rotate but remains fixed, relative to the slats and detector plane. The entire detector system 16 may, of course, rotate around the subject, for example, by means of a rotating gantry. The fan beam-slit collimator finds particular application in planar or SPECT imaging. Planar imaging is performed without rotation of the detector about the patient. The detector is also suitable for use in a rolec-type camera in which the detector rotates about an axis that is perpendicular to the detector plane.

The fan beam-slit arrangement is beneficial for optimizing efficiency while maintaining resolution. In one embodiment, simultaneous optimization of slat length (for the fan beam) and collimator-detector distance (for the slit) in combination with parallel readout of neighboring detector areas which is possible when slit collimators are used with solid state detectors in de-magnification mode, provides a performance which exceeds that of conventional detection systems. As will be appreciated, where thick slats are used for high energy photons, the optimization is not completely possible, but efficiency values are still high.

An analytical model for spatial resolution and geometric efficiency of a collimator in combination with a pixellated detector, such as a pixellated CZT-based detector, can be derived. Descriptions for static and rotating detector concepts can be derived, for example, using National Electrical Manufacturers Association (NEMA) performance criteria for detection efficiency and measures adapted for spatial resolution of pixellated detectors, based on the sampling of the single pixel response function.

Tradeoffs among resolution, efficiency, and signal-to-noise ratio (SNR) have been investigated for different applications. The analysis shows that the concept of rotating collimators suffers from noise accumulation, except for purely hot spot imaging. The fan beam-slit collimator in a demagnification mode provides optimum efficiency and image quality using pixellated solid-state detectors for SPECT cameras.

Without being bound to a particular theory, the following considerations demonstrate a theoretical basis for the improved efficiency of the fan beam-slit collimator. Classical theory describes collimator performance by a radioactive point source whose radiation is projected through the collimator passages and absorbed in the detector. Due to the shadowing effect of the collimator septa, the illuminated pixel area decreases linearly with the distance from the point on the detector directly underneath the point source. A disadvantage of this model results from an understanding that the point source response function is not space invariant.

For pixellated detectors, an alternative approach, based on the response function of a single collimator passage, is proposed, which is far better suited. It enables the derivation of exact equations for geometric efficiency and spatial resolution for a variety of collimator concepts. Based on the equations developed, it is possible to evaluate the image quality of static and rotating collimators and develop concepts for their optimization.

Collimator geometry can be defined by hole diameter D, septa thickness t, pitch P=D+t, septa length L, object plane-collimator distance z, and object plane-detector distance z'=z+L.

Figure 4:
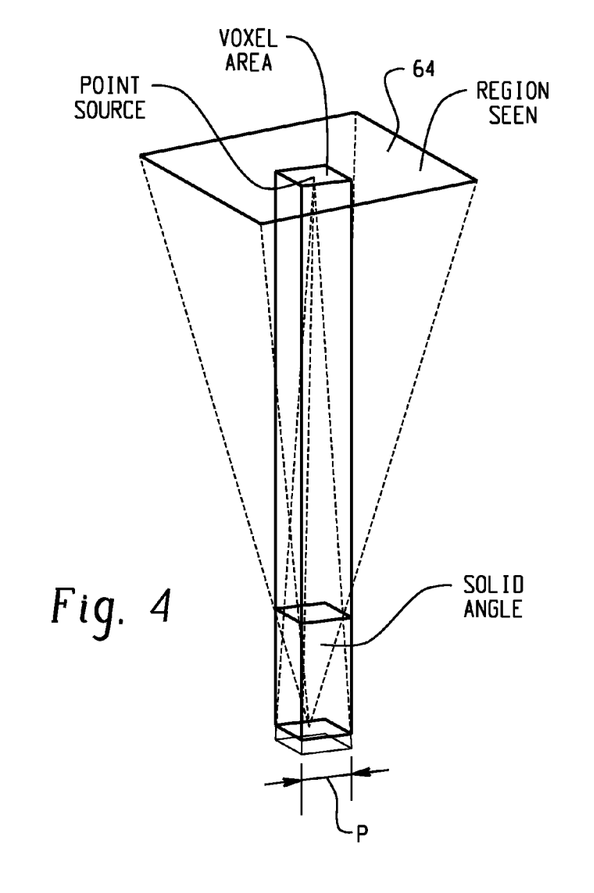
FIG. 4 is a schematic perspective view of a detector pixel demonstrating the efficiency of a collimator.

Geometric efficiency E is calculated as part of the radiation from a point source that irradiates the open detector area of one pixel (normalized solid angle), multiplied by the average area in the object plane that is seen by any point on the detector pixel (region seen) and normalized by the area of the object plane equivalent to one pixel (voxel area) as shown schematically in FIG. 4.

Figure 5:
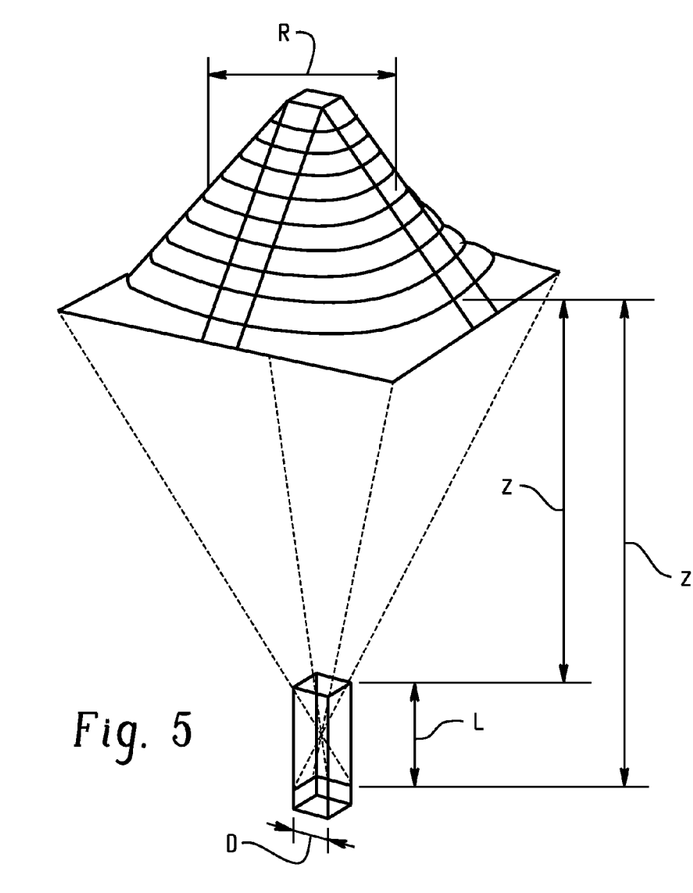
FIG. 5 is a is a schematic perspective view of a detector pixel demonstrating the spatial resolution of a collimator.

Resolution R (FIG. 5) is calculated as the full-width at half-maximum (FWHM) of the single pixel detector response for a point source in the object plane, integrated in one dimension. This definition is equivalent to the standard measurement method used in solid-state x-ray imaging where a line phantom is slightly tilted with respect to one of the detector axes.

Focused collimators provide higher efficiency at the expense of a smaller field-of-view (FOV) or, equivalently, larger detector area. The linear magnification factor m of a collimator with focal length f is:

$$m = f'/(f-z), \text{ where } f' = f + L.$$

Presuming z<f, the solid angle is reduced by a factor $\cos^3 \beta$ for all pixels outside the center part of the detector, explained by the oblique angle of incidence β and the larger object-detector distance. The region seen is reduced by a factor f/f' or $(f/f')^2$, and the voxel area is given by the pixel area divided by m for a fan beam (for a cone beam the voxel area is given by the pixel area divided by $p^2/m^2$).

For a focussed collimator with a slit (the fan beam-slit collimator) the linear magnification factor m is defined by the slit geometry in the x direction and the pixel pitch $p_y$ defined by the slats in the y direction. Specifically:

Hole size: slit: $D_x = RL/z'$, slat distance: $D_y = RLf/z'f$, $D_y > D_x$.
Pixel: in x:

$$p_x = \frac{D_x z'}{2z},$$

in y: $p_y = D_y + t$, $p_y > p_x$.
Magnification in x: $m_x = L/z$ (strong de-magnification)
Magnification in y:

$$m_y = \frac{f'}{f' - z'} = \frac{f'}{f - z}, \quad f' = f + L.$$

(magnification)
Efficiency:

$$E = a_{cone} \frac{D_x D_y^2}{4\pi Lz} \frac{f_y}{f_y - z} \cdot \frac{1}{p_y}.$$

$f_y = f$ (focal length)
$a_{cone}$ is a correction factor for the limited efficiency due to the opening angle.
Resolution:

$$R_x = D_x \frac{z'}{L},$$

$$R_y = D_y \frac{z'}{L} \frac{f_y}{f_y'}$$

Higher efficiency can thus be obtained by a combination of fan beam and slit, using a larger detector size in the y direction.

As an example, the performance of different detectors for general purpose imaging can be determined, as shown in Table 1. Table 1 shows performance parameters of pixellated detector concepts, six of conventional type and two with fan beam-slit collimators of the type disclosed herein.

As discussed above, collimator geometry is defined by pixel size D, septa length or collimator-detector distance L. Performance is given in terms of spatial resolution R, efficiency E, and space-bandwidth product SBP, which is essentially the number of detector pixels when the Nyquist criterion is fulfilled. Another method of expressing efficiency is as the efficiency-space-bandwidth product, ESBP, a measure of the amount of information received by different collimators. All detector values are calculated for 0.152 mm septa thickness (VXGP) and 5 mm resolution at 100 mm source-collimator distance.

Two configurations of a fan beam-slit collimator are considered. Both employ more than one module, i.e., a plurality of slits. In both cases, five slits were used. The focus of the slats, f (and the location of the source) was 10-20 cm. In configuration 1, shown in FIG. 6 (55 cm×73.3 cm in Table 1), the field of view 62 (FOV) is 55 cm in the x direction and 40 cm in the y direction. The slits 46 are oriented in the y direction, the slats (not shown) are oriented in the x direction. Several modules sharing a long slit overlap the 40 cm FOV 62 in the y direction. A large number of modules cover the 55 cm FOV in the x direction. Due to the large opening angle of the fan beams in the y direction, the average efficiency is reduced (the correction factor $a_{cone}$ given above is much smaller than 1).

In the second configuration (FIG. 7) two detector module arrangements (called 'rings' if they form part of a ring around the object) with 55 cm in the x direction and a much smaller size in y are shown. A third detector module arrangement is shown under a different SPECT angle. Modules are smaller in the y direction, therefore the opening angle is smaller and the efficiency is higher (the correction factor $a_{cone}$ given above is nearly equal to 1). Each of the module 'rings' sees only the corresponding region 62A, 62B. The missing region 70 in between the rectangles 62A, 62B is imaged by a shift of the detector rings in y or by additional detectors 74 under different SPECT angles, as shown in FIG. 7. The efficiency per detector area is much higher than in configuration 1. Optimizing for maximum efficiency of static detector concepts, it has been found that a combination of fan beam and slit, employing a detector with focused septa in one dimension and a pinhole detector in the other dimension, gives a higher efficiency than other known static detector arrangements.

In Table 1, the first value of D for the Fan Beam Slit configurations 1 and 2 corresponds to the distance between the slats in the y direction and the second value of D corresponds to the slit width w.

As shown in Table 1, the ESBP of a fan-beam slit collimator is more than 50% higher than the value for a parallel hole collimator when the concept is applied on a large camera (Configuration 1), and it is more than 250% of the parallel hole collimator value when the concept is applied on small modules or rings (Configuration 2), which is a two times higher efficiency than for other detector concepts, such as multi-pinhole. This high value is achieved by a five-fold number of readout channels and an 83% larger detector area compared to a parallel hole detector.

High efficiency can thus be achieved with only moderate increase in detector area and number of readout channels (compared to a multi-pinhole detector concept).

TABLE 1

|  | Detector area (cm²) | D (mm) | L (mm) | R (mm) | E * 1E6 | SBP | ESBP |
|---|---|---|---|---|---|---|---|
| Parallel hole (optimized) | 55 × 40 | 0.733 | 17.18 | 5 | 59.6 | 35200 | 2.10 |
| Fan beam, f = 500 mm (fan axis perpendicular to z-axis) | 55 × 71.2 | 0.812 | 18.56 | 5 | 69.9 | 35200 | 2.46 |
| Fan beam, f = 500 mm (fan axis parallel to z axis) | 75.7 × 40 | 0.812 | 18.56 | 5 | 64.4 | 35200 | 2.27 |

TABLE 1-continued

| | Detector area (cm²) | D (mm) | L (mm) | R (mm) | E * 1E6 | SBP | ESBP |
|---|---|---|---|---|---|---|---|
| Cone beam, f = 500 mm | 88 × 64 | 1,833 | 50 | 5 | 63.7 | 35200 | 2.24 |
| Pinhole, 25 mm (16 × readout) | 55 × 40 | 1.0 | 25 | 5 | 60 | 35200 | 2.11 |
| Pinhole, 12.5 mm (64 × readout) | 55 × 40 | 0.56 | 12.5 | 5 | 72 | 35200 | 2.53 |
| Configuration 1 Fan beam, 250 mm, fan axis perpendicular to z-axis, slit parallel to z axis (5 × readout) | 55 × 73.3 | 1.0/0.9 | 20 | 5 | 92 | 35200 | 3.24 |
| Configuration 2 Fan beam-slit (small ring as above, 5 × readout) | 55 × small rings | 1.0/0.9 | 20 | 5 | 153 | 35200 | 5.39 |

Figure 8:
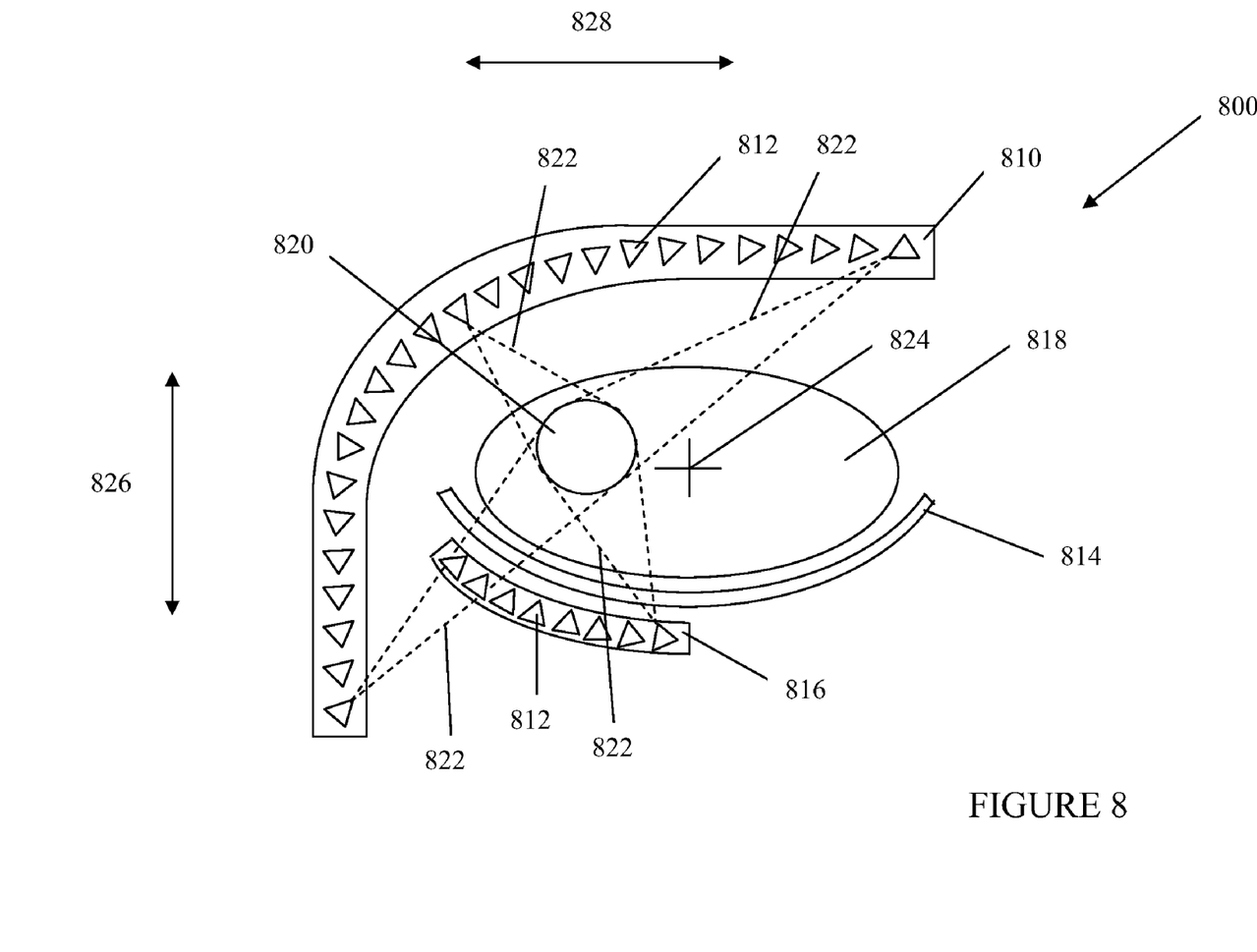
FIG. 8 schematically depicts an axial view of an exemplary imaging system according to an embodiment of the invention.

FIG. 8 schematically represents an axial view of a radiation imaging system 800 according to an embodiment of the invention. As shown, the imaging system 800 is a SPECT imaging system. The imaging system 800 may be used for static or dynamic SPECT imaging. The imaging system 800 may also be used in combination with other imaging devices, such as a CT or MR imaging device. As shown, the imaging system 800 is configured for cardiac SPECT imaging of a subject. However, the imaging system 800 may be configured for use in other applications, such as oncology or neurology applications.

As shown in FIG. 8, the imaging system 800 comprises: a gantry 810 having a plurality of detection modules 812; an optional detection module support or "backpack" 816 having a plurality of detection modules 812; and a subject support 814. The source of radiation for the imaging system 800 shown in FIG. 8 is a radiopharmaceutical introduced into the subject 818. That is, the system 800 is an emission rather than a transmission imaging system. The detection modules 812 of the gantry 810 and the backpack 816 receive the radiation 822 emitted from the source.

As shown in FIG. 8, the gantry 810 is L-shaped. The gantry 810 extends in a vertical direction 826 and a horizontal direction 828 and wraps at least partially around an anterior of the subject 818. The gantry 810 may be adjusted and/or moved relative to the subject 818 and the subject support 814. For example, the gantry 810 may be adjusted up or down in the vertical direction 826, moved in the horizontal direction 828, or moved in the axial direction 824. The adjustability of the gantry 810 permits the imaging system 800 to accommodate subjects of various sizes and facilitates imaging of various portions of the subject 818. Further, the gantry 810 may be adjusted and/or moved such that the detection modules 812 of the gantry are positioned in close proximity to the region of interest (ROI) of the subject 818. Positioning the detection modules 812 in close proximity to the ROI provides for better resolution in the reconstructed image of the region. As shown, the gantry 810 is positioned in close proximity to the cardiac ROI encompassing the heart of the subject 818.

The backpack 816 of the imaging system 800 is optional and may not be used in some embodiments of the imaging system. As shown in FIG. 8, the backpack 816 allows the imaging system 800 to detect radiation from a posterior of the subject 818. It can be useful, for example, in situations where the detection modules 812 near the extremities of the L-shaped gantry 810 are not very close to the ROI, such as when imaging smaller subjects. The backpack 816 may be adjusted and/or moved relative to the subject 818 and the subject support 814. For example, the backpack 816 may be adjusted up or down in the vertical direction 826, moved in the horizontal direction 828, or moved in the axial direction 824. The adjustability of the backpack 816 facilitates imaging of various portions of the subject 818 and permits the detection modules 812 of the backpack to be positioned in close proximity to the ROI of the subject. As shown, the backpack 816 is positioned beneath the subject support 814 on the left side of the subject 818 such that the detection modules 812 are positioned in close proximity to the cardiac ROI.

Figure 9:
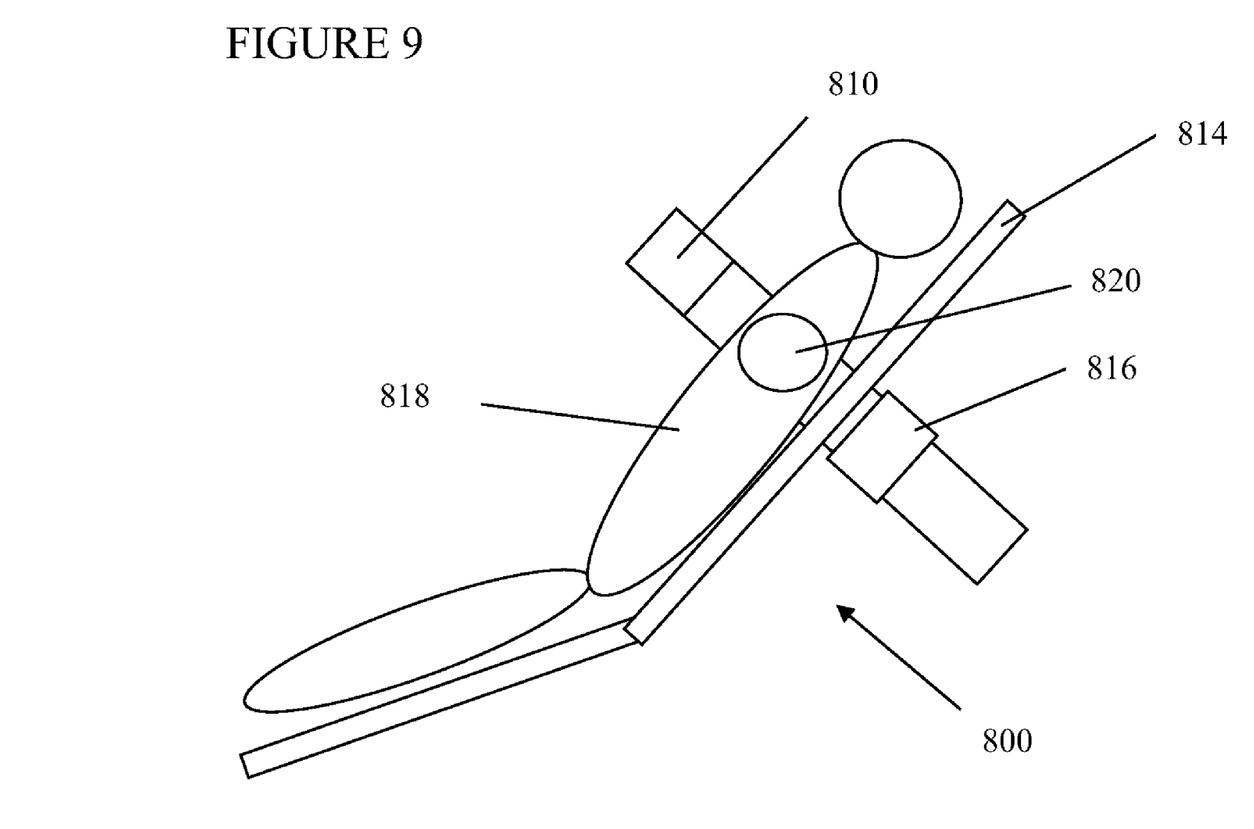
FIG. 9 schematically depicts a side view of the imaging system of FIG. 8, wherein portions of a subject support of the imaging system are angled.

The subject support 814 of the imaging system 800 may also be adjusted and/or moved. For example, FIG. 9 depicts the imaging system 800 with various portions of the subject support 814 angled such that the subject support resembles a chair commonly found in a dentist's office. The adjustability of the subject support 814 allows the user to position the subject 818 in various configurations, such as the partially vertical orientation illustrated in FIG. 9, a full vertical orientation, or a horizontal orientation. This ability to position the subject 818 facilitates imaging of various portions of the subject and may be useful in various imaging applications. Further, the adjustability of the subject support 814 permits the subject 818 to be placed in a comfortable position during acquisition of the image.

The configuration of the gantry 810, backpack 816, and subject support 814 of the imaging system 800 has various features and advantages. For example, as shown, the imaging system 800 does not take up much floor space due to the configuration and adjustability of the system components. The imaging system 800 may also be adapted for subjects of various sizes and shapes. Further, the components of the imaging system 800 may be moved and/or adjusted to image various portions of the subject 818 which may be useful in various imaging applications.

As shown in FIG. 8, the detection modules 812 are schematically depicted as triangles in the gantry 810 and backpack 816 of the imaging system 800. The detection modules 812 include at least one detector and at least one collimator having a body with at least one slit. The invention is not limited to the number of detection modules 812 that may be used in the imaging system 800, or the number of detectors and/or collimators used in each detection module 812.

In some embodiments, each detection module 812 comprises at least one static detector 22 and at least one fan beam-slit collimator 20 (i.e., fan beam collimation) as described above. The slit or slits 46 of the collimator 20 may extend along the axial direction 824 of the system 800. Radiation 822 emitted from the emission source is received through a slit 46 of the collimator 20 and is accessed by the detector 22. In other embodiments of the invention, each detection module 812 comprises at least one detector and at least one slat-slit collimator (i.e., parallel collimation). In these embodiments, the slit or slits of the collimator also extend along the axial direction 824 of the system 800.

The use of either fan beam collimation or parallel collimation provides advantages over, for example, multi-pinhole collimators. Multi-pinhole collimators permit the detector to receive radiation from multiple angles. Multi-pinhole collimators have a high efficiency for the detection of radiation in regions of the object close to the pinholes and a much lower efficiency for regions of the object farther from the pinholes. The use of a focused detection module with a collimator having a slit, such as a fan beam-slit or slat-slit collimator, provides for a more homogeneous system sensitivity. Further, the use of fan beam or parallel collimation avoids axial truncation problems and permits, especially in the case of slat-slit collimators, separate reconstruction of the various transaxial slices.

Each detection module 812 of the gantry 810 is focused on an imaging region 820 that is at least partially surrounded by the L shape of the gantry 810. As shown in FIG. 8, one corner of each detection module 812 triangle on the gantry 810 is pointed towards the imaging region 820 to represent the focus of the detection module 812. The gantry 810 may be adjusted and/or moved by the user to position the imaging region 820 relative to the ROI of the subject 818. As shown in FIG. 8, the gantry 810 is positioned such that the imaging region 820 encompasses the cardiac ROI of the subject 818. A scout scan of the subject 818 may be performed in order to properly position the subject 818 in relation to the gantry 810.

Similarly, each detection module 812 of the backpack 816 is focused towards the imaging region 820. As shown in FIG. 8, one corner of each detection module 812 triangle on the backpack 816 is pointed towards the imaging region 820 to represent the focus of the detection module 812. The backpack 816 may be adjusted and/or moved by the user to position the imaging region 820 relative to the ROI of the subject 818. As shown in FIG. 8, the backpack 816 is positioned such that the imaging region 820 encompasses the cardiac ROI of the subject 818.

The detection modules 812 of the imaging system 800 are static. Thus, the detection modules 812 do not move or adjust within the gantry 810 or the backpack 816 of the imaging system 800 during acquisition of the image. The static detection modules 812 decrease loss of data (i.e., data truncation) in the area between the detection modules because no space is required between the modules to allow them to rotate or pivot. Further, because the detection modules 812 do not need to adjust during acquisition of the image, the acquisition time may be decreased to allow for dynamic SPECT imaging. No adjustment time for movement of the detection modules 812 is required during image acquisition so that more, smaller detection modules may be used. In this way, for example, de-magnification and a low degree of collimation may be used in each module 812, increasing efficiency. Also, to increase such high packing density benefits, the detector in each module may comprise a semiconductor such as CZT or a scintillator with a silicon photomultiplier, a photodiode, an avalanche photodiode, or the like, which do not require much surface area. The non-moving detection modules 812 also help to comfort the subject 818 because no portion of the imaging system 800 is moving near the subject during acquisition of the image.

Figure 10:
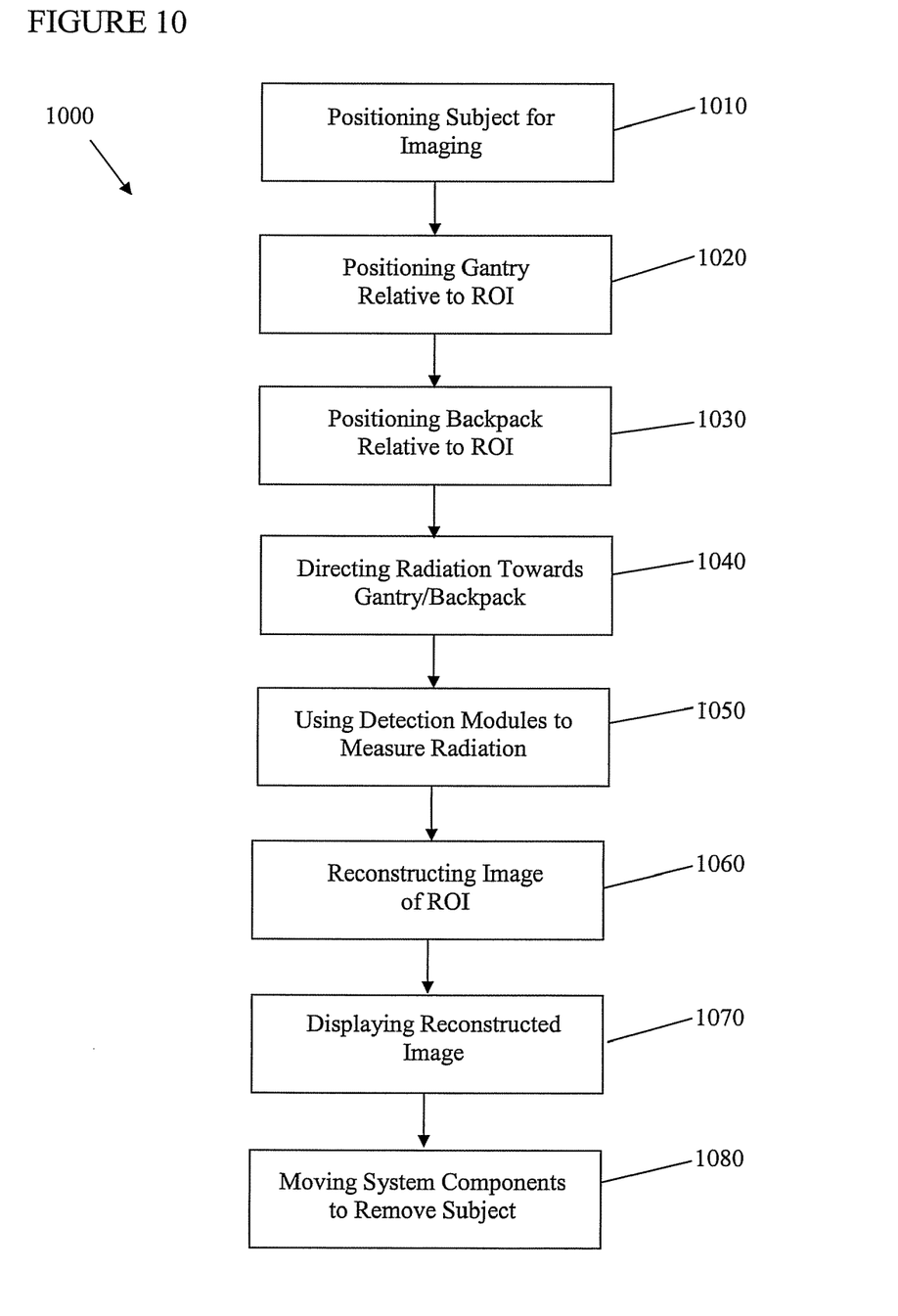
FIG. 10 schematically depicts an exemplary method of acquiring an image using the exemplary imaging system of FIG. 8.

FIG. 10 schematically depicts an exemplary method 1000 of acquiring an image using the imaging system 800. Step 1010 of the method 1000 may include positioning a subject 818 on the subject support 814. The subject support 814 may be adjusted to position the subject 818 in a position that facilitates imaging of a particular ROI or is useful for the particular imaging application. At step 1020, the gantry 810 may be moved and/or adjusted such that the detection modules 812 of the gantry 810 are in close proximity to the ROI and the imaging region 820 encompasses the ROI. Further, at step 1030, the backpack 816 may be moved and/or adjusted such that the detection modules 812 of the backpack are in close proximity to the ROI and the imaging region 820 encompasses the ROI.

During acquisition of the image, at step 1040, radiation 822 may be directed from a radiation source towards the gantry 810 and/or backpack 816 of the imaging system 800. The gantry 810 and backpack 816 have a plurality of detection modules 812. Each detection module 812 comprises a radiation detector. The detection modules 812 are focused such that the imaging region 820 encompasses the ROI. Further, the detection modules 812 do not move during acquisition of the image. One or more of the detection modules 812 may be used at step 1050 to measure radiation 822 which has passed through a collimator between the radiation source and the radiation detector. The collimator is adjacent a radiation receiving face of the detector. The collimator comprises a plurality of spaced slats and a body adjacent the slats which defines at least one elongated slit. The elongated slit is arranged such that the radiation 822 passes through the slit and between the slats to the detector.

The detection modules 812 may be linked to a processing system, such as the system 24, which may be embodied in a user workstation, computer network, or other suitable hardware/software. At step 1060, the processing system reconstructs the image of the ROI, based on signals from the detectors. At step 1070, the reconstructed image may be displayed by a display, such as a screen or printout. The gantry 810, backpack 816, or subject support 814 may be moved or adjusted such that the subject 818 can be removed from the imaging system 800 at step 1080.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An imaging system for acquiring an image of a subject, comprising:
   a gantry having a plurality of detection modules, each detection module comprising a radiation detector and a collimator adjacent a radiation receiving face of the detector, wherein the collimator comprises a plurality of spaced slats and a body adjacent the slats which defines at least one elongated slit, the slit being arranged such that radiation passes through the slit and between the slats to the detector, the body being opaque to the radiation; and
   wherein the detection modules have a common focus and do not move relative to the subject during acquisition of the image.

2. The imaging system of claim 1, wherein the imaging system is a Single Photon Emission Computed Tomography (SPECT) imaging system.

3. The imaging system of claim 2, wherein the imaging system is capable of being used as a static or dynamic SPECT imaging system.

4. The imaging system of claim 1, wherein the gantry extends in a vertical direction and a horizontal direction.

5. The imaging system of claim 1, wherein the gantry is movable such that the common focus of the detection modules is capable of being positioned relative to a region of interest of the subject.

6. The imaging system of claim 1, wherein the collimator comprises a fan beam-slit collimator, and the at least one slit of the collimator extends along an axial direction of the imaging system.

7. The imaging system of claim 1, wherein the collimator comprises a slat-slit collimator, and the at least one slit of the collimator extends along an axial direction of the imaging system.

8. The imaging system of claim 1, wherein the body of the collimator defines a plurality of slits.

9. The imaging system of claim 1 further comprising a subject support movable between a horizontal orientation and an at least partially vertical orientation.

10. The imaging system of claim 1 further comprising a subject support, wherein at least a portion of the subject support is angled such that the subject is positioned in a partially vertical position.

11. The imaging system of claim 1, wherein a second plurality of detection modules are mounted on a common detection module support, and wherein the second plurality of detection modules have a common focus and do not move during acquisition of the image.

12. The imaging system of claim 11, wherein the detection module support is movable such that the common focus of the second plurality of detection modules is capable of being positioned relative to a region of interest of the subject.

13. The imaging system of claim 11, wherein the detection module support is positioned beneath a subject support of the imaging system.

14. A method of acquiring an image of a subject, comprising:
   directing radiation from a source towards a gantry of an imaging system having a plurality of detection modules, each detection module comprising a radiation detector, wherein the detection modules have a common focus and do not move relative to the subject during acquisition of the image; and
   using one or more of the detection modules to measure radiation which has passed through a collimator between the radiation source and the radiation detector, the collimator being adjacent a radiation receiving face of the detector, wherein the collimator comprises a plurality of spaced slats and a body adjacent the slats which defines at least one elongated slit, the slit being arranged such that the radiation passes through the slit and between the slats to the detector.

15. The method of claim 14 further comprising moving the gantry such that the common focus of the detection modules is positioned relative to a region of interest of the subject.

16. The method of claim 14 further comprising reconstructing an image from the measured radiation.

17. The method of claim 14 further comprising directing the radiation from the source towards a second plurality of detection modules mounted on a common detection module support of the imaging system, and wherein the second plurality of detection modules have a common focus and do not move during acquisition of the image.

18. The method of claim 17 further comprising moving the detection module support such that the common focus of the second plurality of detection modules is positioned relative to a region of interest of the subject.

* * * * *